(12) United States Patent
Bensmann (10) Patent No.: US 12,065,244 B2
(45) Date of Patent: *Aug. 20, 2024

(54) WING OF AN AIRCRAFT AND A HOLD-DOWN ARRANGEMENT FOR A WING OF AN AIRCRAFT

(71) Applicant: AIRBUS OPERATIONS GMBH, Hamburg (DE)

(72) Inventor: Stefan Bensmann, Weyhe (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 146 days.

This patent is subject to a terminal disclaimer.

(21) Appl. No.: 17/779,933

(22) PCT Filed: Nov. 3, 2020

(86) PCT No.: PCT/EP2020/080847
§ 371 (c)(1),
(2) Date: May 25, 2022

(87) PCT Pub. No.: WO2021/104810
PCT Pub. Date: Jun. 3, 2021

(65) Prior Publication Data
US 2023/0002031 A1  Jan. 5, 2023

(30) Foreign Application Priority Data
Nov. 25, 2019  (DE) .................. 10 2019 131 839.4

(51) Int. Cl.
*B64C 9/02* (2006.01)
*B64C 3/28* (2006.01)
*B64C 9/22* (2006.01)

(52) U.S. Cl.
CPC ............. *B64C 9/02* (2013.01); *B64C 3/28* (2013.01); *B64C 9/22* (2013.01)

(58) Field of Classification Search
CPC ............. B64C 9/02; B64C 3/28; B64C 9/22
See application file for complete search history.

(56) References Cited

U.S. PATENT DOCUMENTS

| 6,682,023 B2 | 1/2004 | Broadbent |
| 9,239,639 B1 * | 1/2016 | Vanderet ............ G06F 3/03545 |

(Continued)

FOREIGN PATENT DOCUMENTS

| EP | 2 851 288 | 3/2015 |
| EP | 2 998 217 | 3/2016 |

(Continued)

OTHER PUBLICATIONS

Search Report for DE Application No. 10 2019 131 839.4 dated Sep. 11, 2020, 6 pages.

(Continued)

*Primary Examiner* — Brady W Frazier
*Assistant Examiner* — Shanna Danielle Glover
(74) *Attorney, Agent, or Firm* — Nixon & Vanderhye P.C.

(57) ABSTRACT

A wing (5) including a fixed wing (7), a high-lift device (15) and a hold-down arrangement arranged (27) between two supports (23, 25) of the high lift device (15) having a first hold-down element (29) attached to the high-lift device (15) and a second hold-down element (31) attached to the fixed wing (7). The first hold-down element (29) contacts the second hold-down element (31) when the high-lift device (15) is in a retracted position in which it prevents a trailing edge (22) of the high-lift device (15) from detaching from an upper surface (19) of the fixed wing (7) when the fixed wing (7) deforms in the spanwise direction. One of the hold-down elements (29, 31) is a load-limited hold-down element (32) which transition from a first stable state to a second state when the load acting on the hold-down arrangement (27) exceeds an operational threshold.

12 Claims, 4 Drawing Sheets

(56) References Cited

U.S. PATENT DOCUMENTS

2010/0187367 A1    7/2010  Dahl
2015/0353187 A1*   12/2015 Smith ...................... B64C 9/34
                                                      244/214

FOREIGN PATENT DOCUMENTS

EP       3 501 977       6/2019
WO       2018/189299     10/2018

OTHER PUBLICATIONS

International Search Report for PCT/EP2020/080847 dated Feb. 8, 2021, 4 pages.
Written Opinion of the ISA for PCT/EP2020/080847 dated Feb. 8, 2021, 7 pages.

* cited by examiner

WING OF AN AIRCRAFT AND A HOLD-DOWN ARRANGEMENT FOR A WING OF AN AIRCRAFT

RELATED APPLICATION

This application is the U.S. national phase of International Application PCT/EP2020/080847, filed Nov. 3, 2020, which designated the U.S. and claims priority to German patent application DE 10 2019 131 839.4, filed Nov. 25, 2019, the entire contents of each of which are hereby incorporated by reference.

BACKGROUND AND SUMMARY

The present invention is directed to a wing for an aircraft comprising a fixed wing, a high-lift device and a hold-down arrangement. The fixed wing has a leading edge extending along a spanwise direction of the fixed wing and an upper surface forming a suction side of the fixed wing. The high-lift device is movable between a retracted position and a deployed position and attached to the leading edge of the fixed wing via a first support and a second support. The first support is spaced apart from the second support in the spanwise direction. In the retracted position a trailing edge of the high-lift device is in extended contact with the upper surface of the fixed wing. The hold-down arrangement is arranged between the first support and the second support and comprises a first hold-down element attached to the high-lift device and a second hold-down element attached to the fixed wing. The hold-down arrangement is configured such that the first hold-down element only contacts the second hold-down element when the high-lift device is in the retracted position. In the retracted position of the high-lift device the hold-down arrangement prevents the trailing edge of the high-lift device from separating from the upper surface of the fixed wing when the fixed wing deforms or bends in the spanwise direction. The invention is further directed to a hold-down arrangement and an aircraft comprising a wing.

High-lift devices such as slats are commonly mounted to a leading edge of a fixed wing of an aircraft using a first support and a second support. For example, slats are mounted using a master slat track and a slave slat track. Both slat tracks are driven, however only the master slat track fixes the position of the in a spanwise direction of the wing whereas the slave slat track does not fix the slat position in the spanwise direction but allows a spanwise displacement of the slat relative to the slave slat track. For aerodynamic reasons the slat is mounted to the fixed wing such that in the retracted position an upper surface of the slat extends flush with an upper surface of the fixed wing which forms the suction side of the wing. The slat is, in particular, arranged such that there is no gap between the upper surface of the fixed wing and the trailing edge of the slat, i.e., the trailing edge is in extended contact with the upper surface of the fixed wing, and the shape of the slat in the spanwise direction of the wing generally follows the shape of the fixed wing.

As the slat is mounted to the fixed wing in two points only which are spaced from one another in the spanwise direction of the wing, bending or deformation of the fixed wing along the spanwise direction is not or only partly transmitted to the slat. This may result in the trailing edge of the slat not being in continuous or extended contact with the upper surface of the fixed wing or even completely separating from the upper surface. Also, the shape of the slat in the spanwise direction of the wing does not conform to the shape of the fixed wing anymore.

In order to ensure that the trailing edge of the high-lift device remains in extended contact with the upper surface of the fixed wing when the high-lift device is in the retracted position, a hold-down arrangement is provided between the first support and the second support which prevents the trailing edge of the high-lift device from separating from the upper surface and forces the slat to deform with the fixed wing. To this end the hold-down arrangement comprises a first hold-down element attached to the high-lift device and a second hold-down element attached to the fixed wing. The hold-down elements are only in contact with each other when the slat is in the retracted position.

When a wing tip of the fixed wing bends upwards during flight, for example, due to the lift generated by the fixed wing, the second hold-down element pushes downwards against the first hold-down element due to the deformation of the fixed wing and forces the high-lift device to deform with the fixed wing. Thus, in essence a third contact point between the high-lift device and the fixed wing is created in addition to the first and second support which in the retracted position ensures that the high-lift device is forced to deform with the fixed wing so that the upper surface of the high-lift device remains flush with the upper surface of the fixed wing.

The transfer of the spanwise deformation from the fixed wing to the high-lift device by means of the hold-down arrangement requires a high-lift device that is able to withstand the same deformation as the fixed wing and withstand the additional loads generated by the hold-down arrangement. Thus, a high-lift device being forced to deform with the fixed wing and, thereby, provide the necessary aerodynamic performance has to be able to be more robust and in consequence heavier than a high-lift device that does not follow the spanwise deformation of the fixed wing. Also, the fixed wing has to be more robust as it has to bear the additional loads that are required for deforming the high-lift device.

In view of the above it is an object of the present invention to provide an improved wing, an improved hold-down arrangement and an improved aircraft.

According to a first aspect the problem underlying the present invention is solved by a wing for an aircraft comprising a fixed wing, a high lift device and a hold-down arrangement. The fixed wing has a leading edge extending along a spanwise direction of the fixed wing and an upper surface forming a suction side of the fixed wing. The high-lift device is movable between a retracted position and a deployed position and attached to the leading edge of the fixed wing via a first support and a second support. The first support is spaced apart from the second support in the spanwise direction. In the retracted position a trailing edge of the high-lift device is in extended contact with the upper surface of the fixed wing. The hold-down arrangement is arranged between the first support and the second support and comprises a first hold-down element attached to the high-lift device and a second hold-down element attached to the fixed wing. The hold-down arrangement is configured such that the first hold-down element is in contact with the second hold-down element when the high-lift device is in the retracted position but is not in contact with the second hold-down in element when the high-lift device is in the deployed position. In the retracted position of the high-lift device the hold-down arrangement prevents the trailing edge of the high-lift device from separating from the upper surface of the fixed wing when the fixed wing deforms in the spanwise direction. One of the first hold-down element and the second hold-down element is a load-limited hold-down element which has at least a first stable state and a second state. The load-limited hold-down element is configured such that the hold-down arrangement prevents the trailing edge of the high-lift device from separating from the upper surface of the fixed wing when the load-limited hold-down element is in the first stable state and the high-lift device is in the retracted position, that the hold-down arrangement does not prevent the trailing edge of the high-lift device from separating from the upper surface of the fixed wing when the load-limited hold-down element is in the second state and the high-lift device is in the retracted position, and that the load-limited hold-down element transitions from the first stable state to the second state when loads transmitted through the load-limited hold-down element for preventing the trailing edge of the high-lift device from separating from the upper surface of the fixed wing exceed an operational threshold.

In other words, the present wing for an aircraft is, for example, a main wing with a fixed wing and a high-lift device in form of a slat. The fixed wing has a leading edge which extends along but not necessarily parallel to the spanwise direction of the fixed wing. An upper surface of the fixed wing forms a suction side of the fixed wing and may also be referred to as a suction surface of the fixed wing. The fixed wing extends in the spanwise direction between an inward or inboard end which may, for example, be adapted to be attached to a fuselage of an aircraft, and a wing tip which forms the outer or outboard end of the fixed wing.

When the aircraft is in flight, the lift created by the fixed wing deforms the wing. In particular, the wing is curved upwards such that the wing tip moves upwards relative to the inward end of the fixed wing. The amount by which the fixed wing bends or deforms depends on various factors among which are speed of the aircraft and weather conditions. For example, the deformation of the fixed wing increases considerably when an aircraft accelerated from take-off speed to cruise speed.

The high-lift device attached to the wing is mounted to the wing using only two supports, a first support and a second support. The supports which may, for example, be slat tracks are used to move the high-lift device between a retracted and one or more deployed positions. When the high-lift device is in the retracted position, its trailing edge shall for aerodynamic reasons be in extended contact with the upper surface of the fixed wing such that an upper surface of the high-lift device extends flush with the upper surface of the fixed wing, i.e., such that no gap exists between the upper surface of the fixed wing and the trailing edge of the high-lift device.

As previously discussed, due to the changing curvature of the fixed wing during flight and the fact that the high-lift device is only mounted in two points to the fixed wing, the slat does not deform with the fixed wing in the spanwise direction. Hence, a hold-down arrangement comprising a first and a second hold down element is used to provide a third contact point between the high-lift device and the fixed wing when the high-lift device has been retracted, i.e., is in the retracted position. The first hold-down element is attached or mounted to the high-lift device and the second hold-down element is mounted to the fixed wing such that the first hold-down element and the second hold-down element only come into contact or engage when the high-lift device is in the retracted position. By means of the hold-down arrangement it is ensured that a relative downward deformation of the fixed wing in the spanwise direction between the first and the second support of the high-lift device corresponding to an upward movement of the wing tip of the fixed wing relative to the fixed wing's inward end is transferred to the high-lift device such that the high-lift device follows the curvature or deformation of the fixed wing. As a result, the trailing edge of the high-lift device constantly maintains extended contact with the upper surface of the fixed wing.

However, according to the present invention one of the first and the second hold-down elements is a load-limited hold-down element that has a first stable state and a second state. The second state may also be stable but could also be a metastable state. As will be set out in the following paragraphs in more detail the load-limited hold-down element transitions from the first stable state to the second state under sufficiently high loads.

The load-limited hold-down element is initially in the first state which is a stable state. While the load-limited hold-down element is the first stable state, the hold-down arrangement is configured to prevent the trailing edge of the high-lift device from separating from the upper surface of the fixed wing while the high-lift device is in the retracted position. To this end, a load path is formed by the hold-down arrangement between the fixed wing and the high-lift device that transfers any relative downward deformation of the fixed wing in the spanwise direction between the first support and the second support to the high-lift device.

However, when the load or force transmitted through the load-limited hold-down element exceeds an operational threshold, the load-limited hold-down element transitions or deforms from the first stable state to the second state. The deformation of the load-limited hold-down element is reversible. When the load-limited hold-down element transitions to the second state its dimensions change such that the hold-down arrangement can no longer prevent the trailing edge of the high-lift device from separating from the upper surface of the fixed wing. Due to the deformation of the load-limited hold-down element, the load path between the fixed wing and the high-lift device is interrupted and deformations of the fixed wing along the spanwise direction are not further transmitted to the high lift device.

The operational threshold may, for example, be chosen such that the load-limited hold-down element does not transition from the first stable state to the second state when the spanwise deformation of the fixed wing is within limits that are experienced during regular flights but changes its shape when deformations occur that are only experienced in extreme corners of the flight envelope in which the high-lift device has to bear very high loads due to the forced deformation and the increased drag due to the trailing edge of the high-lift device separating from the upper surface of the fixed wing is tolerable. In any case the operational threshold is chosen such that the load-limited hold-down element transitions from the first stable state to the second state well-before the spanwise deformation of the fixed wing reaches operational limits.

Thereby, the loads transmitted through the hold-down arrangement are advantageously limited to loads occurring during regular flight conditions for which it is essential to keep the trailing edge of the high-lift device in extended contact with the upper surface of the fixed wing to improve the aerodynamic performance of the fixed wing. However, during rare and extreme flight situations in which the curvature of the fixed wing along the spanwise direction exceeds commonly occurring curvatures, the load-limited hold-down element transitions to the second state due to the forces acting thereon. In such a rare case aerodynamic performance of the wing are of less concern and it is instead preferred to reduce the loads acting on the high-lift device or, in other words, to limit the force deformation of the high-lift device. As the maximum deformation of the high-lift device is reduced as compared to a rigid or non-deforming hold-down element, the high-lift device may be constructed less robust. This may, in particular, advantageously allow reducing the weight of the high-lift device. Further, since the load on the fixed wing is also reduced as it does not have to bear the additional load that is required to deform the high-lift device.

The operational threshold may, for example, be chosen such that the load-limited hold-down element transitions form the first stable state to the second state when a load factor exceeds a value of 2.0, preferably of 1.75 and most preferably of 1.3, where the load factor is defined as the ratio of lift of an aircraft to its weight.

In a preferred embodiment the second hold-down element is the load-limited hold-down element. In other words, it is preferred that the load-limited hold-down element is the hold-down element mounted to the fixed wing.

In a preferred embodiment the load-limited hold-down element is a disk spring. Disk springs may also be referred to as cup springs, plate springs or Belleville spring washers. A disk spring may have the shape of a truncated cone. It is relatively rigid up to the operational threshold above which it suddenly deforms and transitions into the second state.

Using a disk spring as load-limited hold-down element has the advantage that the disk spring is a simple element from a constructional perspective, it is easy to install and very tolerant against loads acting sideways.

Alternatively, the load-limited hold-down element may be a buckling element formed by two contact plates and a one or more of strip-shaped or plate-shaped connecting elements extending in parallel to one another between the contact plates. In the first stable state the plurality of connecting elements are configured to hold the contact plates spaced apart from one another at a first distance. The connecting elements are configured to buckle when loads transmitted through the load-limited hold-down element for preventing the trailing edge of the high-lift device from separating from the upper surface of the fixed wing exceed the operational threshold such that the buckling element transitions to the second state in which the contact plates are held spaced apart from one another by the connecting elements at a second distance, wherein the second distance is smaller than the first distance.

Preferably, the connecting elements are configured such that buckling of the connecting elements is an elastic deformation. This allows the buckling element to return to its original first stable state after it transitioned to the second state. Thus, the load-limited hold-down element would be reusable even after an initial deformation.

In a preferred embodiment the load-limited hold-down element is configured such that the load-limited hold-down element transitions from the second state to the first stable state when a load acting on the load-limited hold down element exceeds a reset threshold, wherein the reset threshold is lower than the operational threshold. In other words, less force is required to trigger the load-limited hold-down element to transition back from the second state to the first state.

In a preferred embodiment the hold-down arrangement comprises a biasing means for biasing the load-limited hold-down element towards the first stable position. A biasing load generated by the biasing means preferably exceeds the reset threshold. The biasing means is preferably formed as a spring. Providing a biasing means enables the load-limited hold-down element to automatically transition back from the second state to the first stable state after an initial transition has taken place. To this end, the biasing means is preferably dimensioned such that the force acting on the load-limited hold-down element exceeds the reset threshold so that the hold-down arrangement may be immediately functional again once the high loads that trigger the initial deformation are no longer acting on the hold-down arrangement. Thus, the hold-down arrangement advantageously prevents high-loads on the high-lift device due to excessive forced deformation of the fixed wing and at the same time ensures improved aerodynamic performance once deformation of the fixed wing is within the limits tolerable by the high-lift device.

It is further preferred if the second state is a metastable state. In a metastable state only little force is limited to trigger a transition of the load-limited hold-down element out of the second state and back to the first stable state.

In a preferred embodiment the high-lift device is a slat, wherein the first support is preferably a master slat track and the second support is preferably a slave slat track.

In a second aspect the problem underlying the present invention is solved by a hold-down arrangement for a wing of an aircraft. The wing comprises a fixed wing and a high-lift device, wherein the wing has a leading edge extending along a spanwise direction of the fixed wing and an upper surface forming a suction side of the fixed wing and wherein the high-lift device is movable between a retracted position and a deployed position and attached to the leading edge of the fixed wing via a first support and a second support, wherein the first support is spaced apart from the second support in the spanwise direction and wherein in the retracted position a trailing edge of the high-lift device is in extended contact with the upper surface of the fixed wing. The hold-down arrangement comprises a first hold-down element attachable to the high-lift device of the wing and a second hold-down element attachable to the fixed wing of the wing such that the first hold-down element is in contact with the second hold-down element when the high-lift device is in the retracted position but is not in contact when the high-lift device is in the deployed position, that the hold-down arrangement is arranged between the first support and the second support of the wing and that in the retracted position of the high-lift device the hold-down arrangement prevents the trailing edge of the high-lift device from detaching from the upper surface of the fixed wing when the fixed wing is deformed in the spanwise direction. One of the first hold-down element and the second hold-down element is a load-limited hold-down element which has at least a first stable state and a second state. The load-limited hold-down element is configured such that the hold-down arrangement prevents the trailing edge of the high-lift device from detaching from the upper surface of the fixed wing when the load-limited hold-down element is in the first stable state and the high-lift device is in the retracted position, that the hold-down arrangement does not prevent the trailing edge of the high-lift device from detaching from the upper surface of the fixed wing when the load-limited hold-down element is in the second state and the high-lift device is in the retracted position, and that the load-limited hold-down element transitions from the first stable state to the second state when loads transmitted through the load-limited hold-down element for preventing the trailing edge of the high-lift device from detaching from the upper surface of the fixed wing exceed an operational threshold.

The hold-down arrangement may be configured in the same way as the hold-down arrangement which has been described as part of the preferred embodiments of a wing for an aircraft. For the sake of brevity, details of these embodiments are not repeated here but reference is made to the preceding description. The advantages of the hold-down arrangement correspond to the advantages of the respective embodiments of a wing for an aircraft.

In a preferred exemplary aspect the problem underlying the present invention is solved by using a hold-down arrangement in a wing of an aircraft. The wing comprises a fixed wing and a high-lift device, wherein the wing has a leading edge extending along a spanwise direction of the fixed wing and an upper surface forming a suction side of the fixed wing and wherein the high-lift device is movable between a retracted position and a deployed position and attached to the leading edge of the fixed wing via a first support and a second support, wherein the first support is spaced apart from the second support in the spanwise direction and wherein in the retracted position a trailing edge of the high-lift device is in extended contact with the upper surface of the fixed wing. The hold-down arrangement comprises a first hold-down element attachable to the high-lift device of the wing and a second hold-down element attachable to the fixed wing of the wing such that the first hold-down element is in contact with the second hold-down element when the high-lift device is in the retracted position and is not in contact with the second hold-down element when the high-lift device is in the deployed position, that the hold-down arrangement is arranged between the first support and the second support of the wing and that in the retracted position of the high-lift device the hold-down arrangement prevents the trailing edge of the high-lift device from separating from the upper surface of the fixed wing when the fixed wing deforms in the spanwise direction. One of the first hold-down element and the second hold-down element is a load-limited hold-down element which has at least a first stable state and a second state. The load-limited hold-down element is configured such that the hold-down arrangement prevents the trailing edge of the high-lift device from separating from the upper surface of the fixed wing when the load-limited hold-down element is in the first stable state and the high-lift device is in the retracted position, that the hold-down arrangement does not prevent the trailing edge of the high-lift device from separating from the upper surface of the fixed wing when the load-limited hold-down element is in the second state and the high-lift device is in the retracted position, and that the load-limited hold-down element transitions from the first stable state to the second state when loads transmitted through the load-limited hold-down element for preventing the trailing edge of the high-lift device from separating from the upper surface of the fixed wing exceed an operational threshold.

The hold-down arrangement used in the wing may in particular correspond to the different embodiments of hold-down arrangements previously described.

Finally, in a further aspect an aircraft comprising a fuselage and a wing as in the previously described embodiments solves the problem underlying the present invention. The advantages of the aircraft correspond to the advantages of the respective embodiment of a wing comprised therein.

SUMMARY OF DRAWINGS

In the following, exemplary embodiments of a wing for an aircraft including exemplary embodiments of a hold-down arrangement will be described with reference to the drawings, wherein.

DETAILED DESCRIPTION

In the following description of exemplary embodiments of aircraft, wings for aircraft and hold-down arrangements like elements will be designated with like reference numerals throughout all drawings. The description will commence with FIG. 1 where an exemplary embodiment of an aircraft is shown, continue with FIGS. 2 and 3 which show a schematic drawing of a section of an exemplary embodiment of a wing and finally turn towards FIG. 4 as well as 5a and 5b which each show a sectional drawing of a wing with a hold-down arrangement.

Figure 1:
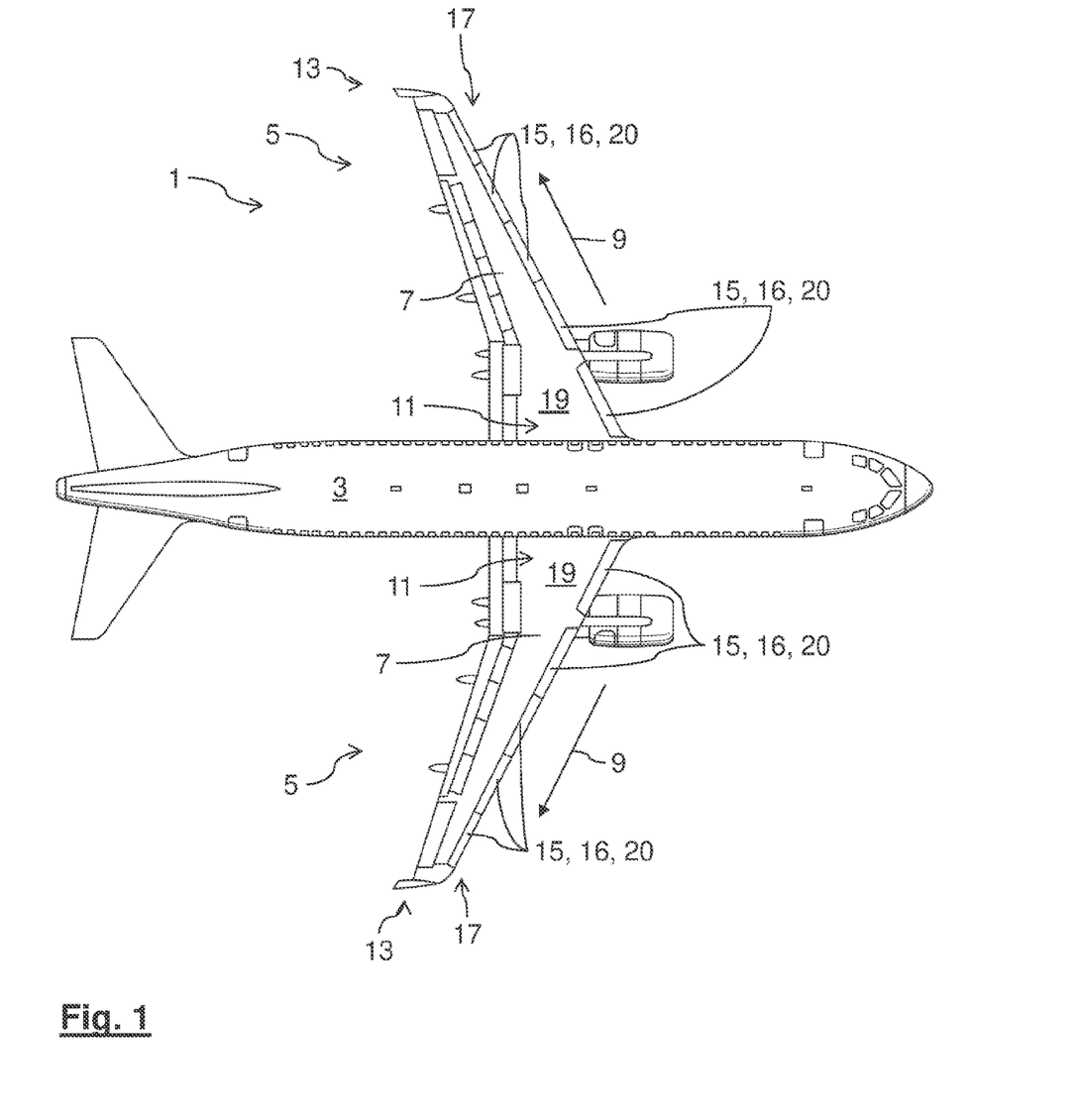
FIG. 1 shows an exemplary embodiment of an aircraft with an exemplary embodiment of a wing.

FIG. 1 shows a top view of an exemplary embodiment of an aircraft 1 with a fuselage 3 and two wings 5. Each wing 5 comprises a fixed wing 7 extending in a spanwise direction 9 between an inward end or root 11 and an outward end or wing tip 13. The fixed wing 7 includes the upper surface 19, lower surface 52 and leading edge 53. The wings 5 further comprise a plurality of high-lift devices 15 in form of slats 16 mounted to the leading edge 17 of the fixed wings 7. Since FIG. 1 shows a top view of the aircraft 1, the upper surfaces 19, 20 forming the respective suction side of the fixed wings 7 and the high-lift devices 15 are visible. In FIG. 1 the high-lift devices 15 are shown in respective retracted positions in which the upper surfaces 20 of the high-lift devices 15 extend flush with the upper surface 19 of the fixed wing 5.

Figure 2:
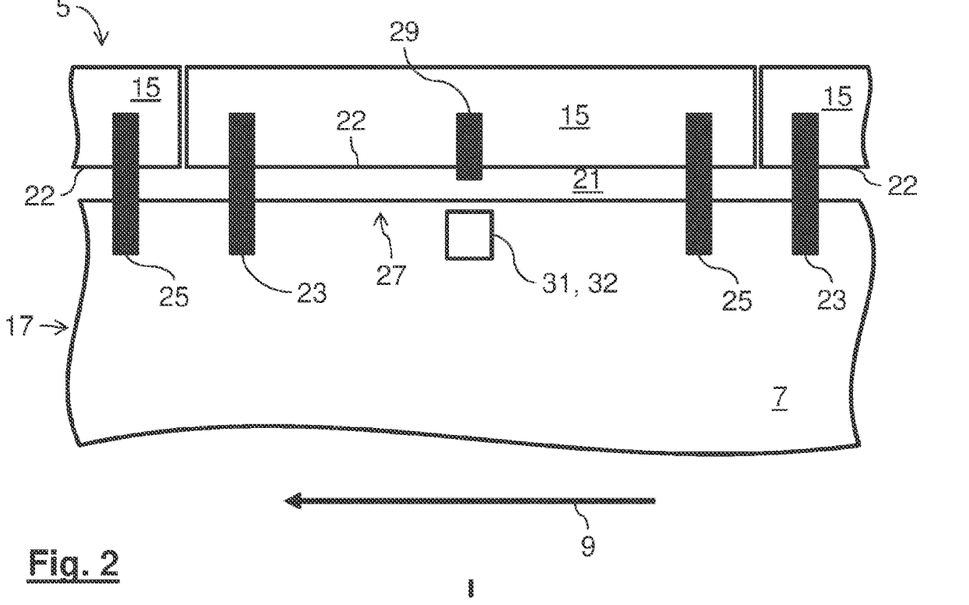
FIG. 2 shows a schematic drawing of an exemplary embodiment of a wing with an exemplary embodiment of a hold-down arrangement with a high-lift device in a deployed position.
Figure 3:
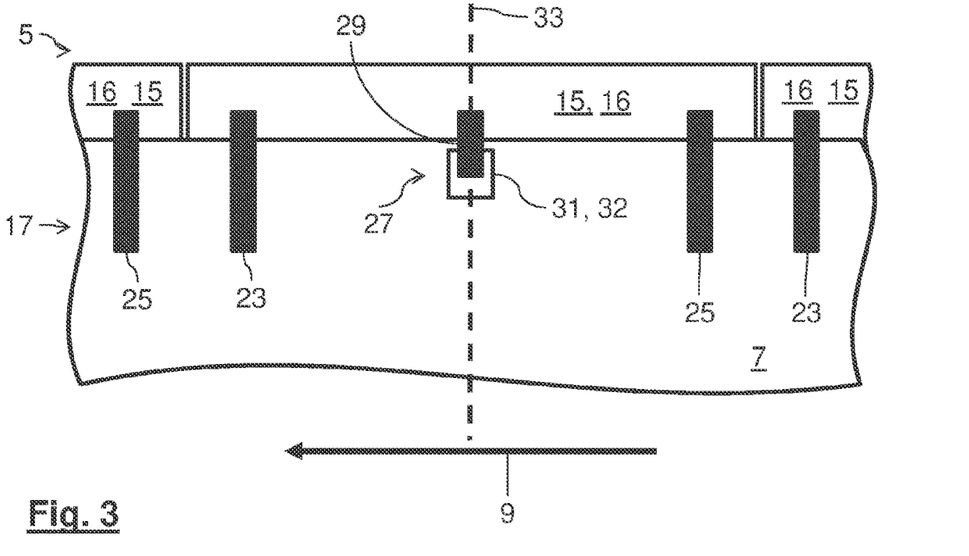
FIG. 3 shows a schematic drawing of the exemplary embodiment of a wing of FIG. 2 with the high-lift device in a retracted position.

FIGS. 2 and 3 each show a schematic view of a section of an exemplary embodiment of a wing 5 from below the wing 5, i.e., from the opposing side of the upper surface 19 shown in FIG. 1. The wing 5 may, in particular, be one of the wings 5 shown in FIG. 1. It comprises a fixed wing 7 and three high-lift devices 15 in form of slats 16 mounted to the leading edge 17 of the fixed wing 7. The fixed wing 7 and the inner and outer high-lift device 15 are shown in FIGS. 2 and 3 only partially. For example, neither the full length of the wing 5 in in the spanwise direction 9 nor its complete extension in the cordline direction are shown. Similarly, the inner and outer high-lift devices 15 are also only shown in part in the spanwise direction 9 of the fixed wing 7.

Figure 4:
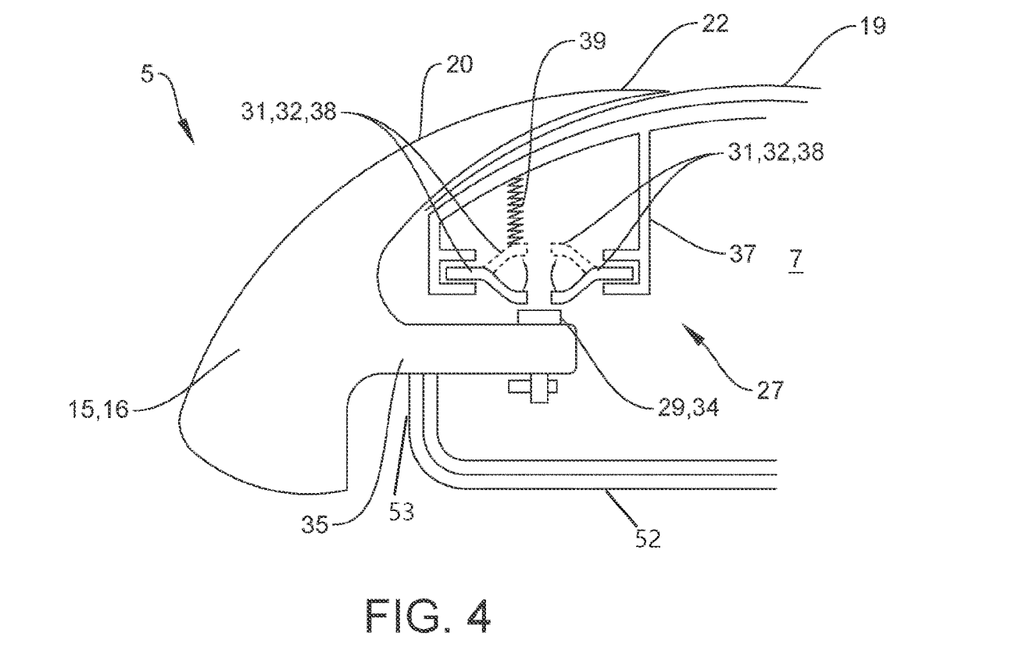
FIG. 4 shows sectional drawing of an exemplary embodiment of a wing comprising an exemplary embodiment of a hold-down arrangement.
Figure 5A:
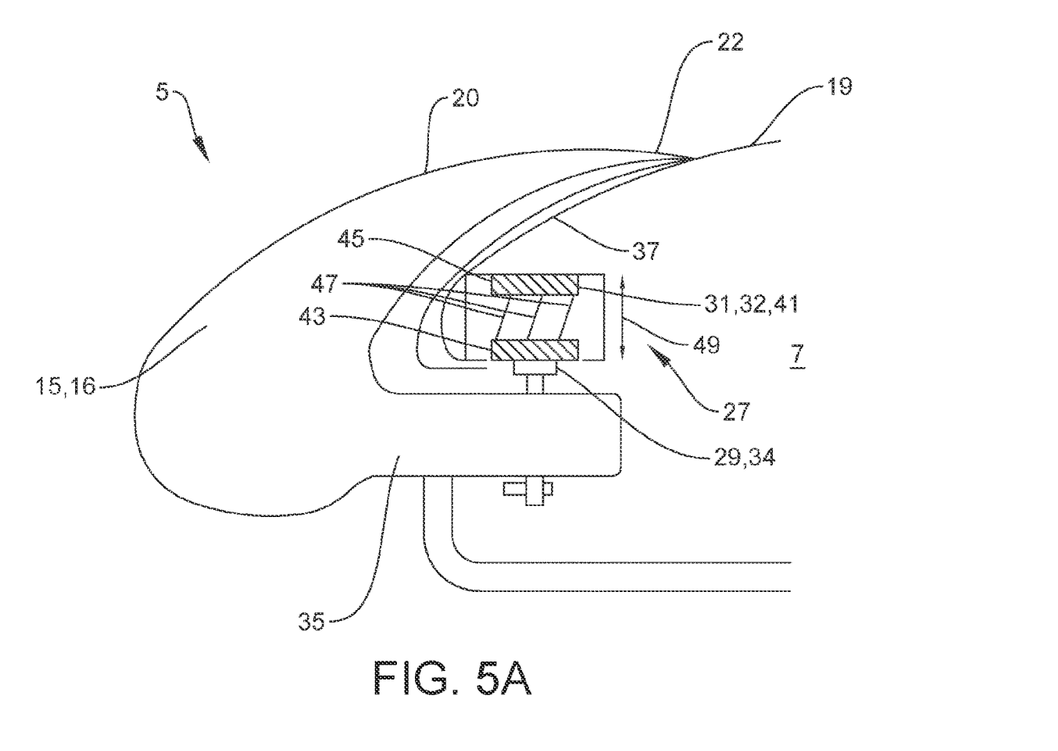
FIG. 5a shows a sectional drawing of another exemplary embodiment of a wing comprising another exemplary embodiment of a hold-down arrangement with a load-limited hold-down element in a first stable state and FIG. 5b shows another sectional drawing of the exemplary embodiment of FIG. 5a with the load-limited hold-down element in a second state.
Figure 5B:
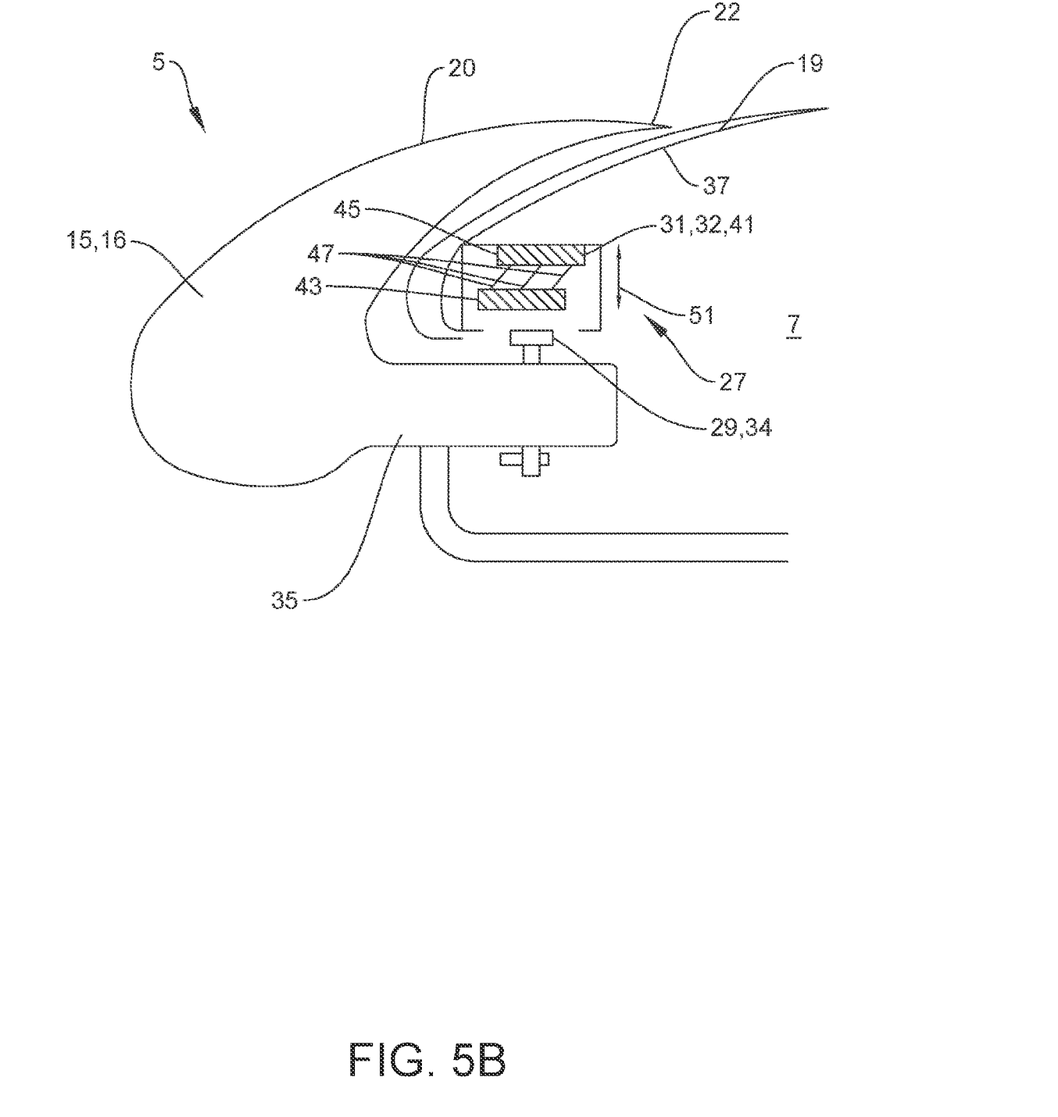

In FIG. 2 the high-lift devices 15 are shown in a deployed position indicated by a gap 21 between the fixed wing 7 and the high-lift devices 15; in FIG. 3 the high-lift devices are shown in a retracted position in which the high-lift devices 15 overlap with the fixed wing 7 and are partly hidden behind the fixed wing. The high-lift devices 15 are mounted to the fixed wing 7 such that their respective trailing edges 22 (only visible in FIG. 2) are in extended contact with the upper surface 19 of the fixed wing 7. Since FIGS. 2 and 3 show the wing 5 from below, the trailing edges 22 of the high-lift devices 15 are not visible in FIG. 3. However, for the sake of completeness it is noted that a trailing edge 22 of a high-lift device 15 in extended contact with the upper surface 19 of a fixed wing 7 is shown in FIGS. 4, 5a and 5b.

Each of the high-lift devices 15 is mounted to the leading edge 17 of the fixed wing 7 via a first support 23 and a second support 25. The supports 23, 25 are spaced apart from one another in the spanwise direction 9 of the wing 5 and enable the movement of the high-lift devices 15 between the deployed position shown in FIG. 2 and the retracted position shown in FIG. 3. One of the first and second supports 23, 25, for example, the respective first supports 23 may be driven via a drive unit (not shown) for moving the high-lift devices or slats 15. The second supports 25 may be not driven such that they only follow the motion induced by the first support 23. In such an embodiment where the high-lift devices 15 are slats 16, the first supports 23 may also be referred to as master slat tracks 23 and the second supports 25 may also be referred to as slave slat tracks 25.

As previously discussed, the lift and drag on the fixed wing 7 as well as other motions of the aircraft 1 deform the fixed wing 7 along the spanwise direction 9 of the wing 5. As each high-lift device 15 is only attached via two supports 23, 25 to the fixed wing 7, the deformation of the fixed wing 7 along the spanwise direction is not transmitted to the high-lift device. In particular, any upwards bending of the wing tip 13 caused by the increasing lift of the wing 5 with increasing velocity of the aircraft 1 would cause the fixed wing 7 to move downwards relative to the trailing edge 22 of the high-lift devices 15 in the region between the first and second supports 23, 25. This may cause the respective trailing edges 22 of the high-lift devices 15 to detach from the upper surface 19 of the fixed wing 7 so that the upper surfaces 19, 20 of the fixed wing 7 and the high-lift devices 15 are no longer flush and the aerodynamic performance of the wing 5 are affected negatively. In particular, the drag may be increased.

Hence, for each of the high-lift devices 15 a hold-down arrangement 27 is provided which comprises a first hold-down element 29 attached to the respective high-lift device 15 and a second hold-down element 31 attached to the fixed wing 7. Only the hold-down arrangement 27 of the high-lift device 15 in the center of FIGS. 2 and 3 is shown. The hold-down arrangement 27 is arranged between first and second supports 23, 25 of the respective high-lift device 15.

As can be seen in FIGS. 2 and 3, when the high-lift devices 15 are in their respective deployed position, the first hold-down element 29 attached to the high-lift device 15 is not in contact with the second hold-down element 31 attached to the fixed wing 7. However, when the high-lift device 15 is in the retracted position, the first hold-down element 29 comes into contact with the second hold-down element 31. In other words, the first hold-down element 29 is only in contact with the second hold-down element 31 when the high-lift device 15 to which the first hold-down element 29 is mounted is in its retracted position. It should be pointed out that for technical reason a first contact will need to be established before the high-lift device 15 has reached its final retracted position. However, the contact is essentially limited to the retracted position.

Once the first and second hold-down elements 29, 31 have come into contact or have been brought into engagement with one another, the second hold-down element 31 holds the first hold-down element 29 down and thus transmits any relative downward deformation of the fixed wing 7 to the high-lift device 15. Thereby, the high-lift device 15 is forced to deform with the fixed wing 7 and the trailing edge 22 is prevented from separating from the upper surface 19 of the fixed wing 7.

In order to limit the forced spanwise deformation of the high-lift devices 15, the second hold-down element 31 is formed as a load-limited hold-down element 32 which transitions from a first stable state to a second state when the forces or loads transmitted through the hold-down arrangement 27 from the fixed wing 7 to the high-lift device 15 exceed an operational threshold. The operational threshold is chosen such that the load-limited hold-down element 32 remains in the first stable state and the hold-down arrangement 27 prevents the trailing edge 22 of the high-lift device 15 from separating from the upper surface 19 of the fixed wing 7 during regular flight conditions and common flight maneuvers. When the loads exceed the operational threshold, i.e., reach the structural or operational limits of the slats 16, for example, when the aircraft 1 operates in corners of the flight envelope, i.e., during extreme flight conditions, the load-limited hold-down element 32 transitions from the first stable state to the second state which may, for example, be metastable.

Once the load-limited hold-down element 32 has transitioned to the second state, the hold-down arrangement 27 does no longer force the high-lift device 15 to deform with the fixed wing 7 and thereby prevents the trailing edge 22 of the high-lift device 15 from separating from the upper surface 19 of the fixed wing 7 when the latter deforms in the spanwise direction 9. Hence, both the high-lift device 15 and the fixed wing have to bear less load and may, therefore, be designed less robust which may provide a production cost and/or weight benefit.

FIG. 4 shows a more detailed exemplary embodiment of a wing 5 comprising an exemplary embodiment of a hold-down arrangement 27. The wing 5 may, for example, be the wing 5 of FIG. 1, 2 or 3. Only a partial section through the wing 5 is shown in FIG. 4 which may, for example, be taken along the dashed line 33 in FIG. 3. With regard to features of the wing 5 not shown in FIG. 4 reference is made to FIGS. 1 to 3.

The wing 5 shown in FIG. 4 also comprises a fixed wing 7 to which a high-lift device 15 in form of a slat 16 is mounted using two supports (not shown). In FIG. 4 the slat 16 is shown in the retracted position in which its trailing edge 22 is in extended contact with the upper surface 19 of the fixed wing 7 such that the upper surfaces 19, 20 of the high-lift device 15 and the fixed wing 7 form a continuous surface.

The wing 5 comprises a hold-down arrangement 27 with a first and a second hold down element 29, 31. The first hold-down element 29 is an adjustable contact pad 34 which is mounted to a hold-down rib 35 of the slat 15. The contact pad 34 is adjustable in that its height relative to the hold-down rib 35 can be adjusted to adapt the position of the slat 15 in its retracted position. The first hold-down element 29 is in contact with a second hold-down element 31 that is also part of the hold-down arrangement 27.

The second hold-down element 31 is a load-limited hold-down element 32 that is mounted to the fixed wing via a rib 37. The load-limited hold-down element 32 is formed as a disk spring 38. It has a first stable state shown in FIG. 4 with continuous lines and a second metastable state shown in FIG. 4 with dashed lines. The load-limited hold-down element 32 transitions from the first stable state to the second state and changes its shape when a load acting through the load-limited hold-down element 32 onto the first hold-down element 29 exceeds an operational threshold.

A disk spring 38 is used as load-limited hold-down element 32 in the embodiment of FIG. 4 as the disk spring 38 is very rigid until the operational threshold is reached when it suddenly deforms into the second state. Due to the sudden deformation, the load transfer from the fixed wing 7 to the high-lift device 15 is immediately interrupted. This advantageously stops any further deformation of the high-lift device 15 and prevents high loads due to excessive deformation along the spanwise direction 9.

The load-limited hold-down element 32 of FIG. 4 further comprises a biasing means 39 in form of a spring 39 which biases the load-limited hold-down element 32 towards the first stable position. In detail, the biasing means 39 exerts a biasing force onto the disk spring 38 when the disk spring 38 has deformed into the second state. The biasing force exerted by the biasing means 39 urges the disk spring 38 back to the first stable state. As it exceeds a reset threshold that is lower than the operational threshold, the disk spring 38 will automatically return to the first stable state.

FIGS. 5a and 5b show another exemplary embodiment of a wing 5 comprising an exemplary embodiment of a hold-down arrangement 27. The wing 5 and the hold-down arrangement 27 of FIG. 5 only differ from the wing 5 and the hold-down arrangement 27 of FIG. 4 in the way the second (load-limited) hold-down element 31, 32 attached to the fixed wing 7 is formed. Thus, the description of the embodiments of FIGS. 5a and 5b will be limited to those aspects that differ from the embodiment of FIG. 4. The wing 5 shown in FIGS. 5a, 5b may be a cut through the wing 5 shown in FIGS. 2 and 3 along the dashed line 33.

The second hold-down element 31 of the embodiment shown in FIGS. 5a, 5b is formed as a buckling element 41. FIGS. 5a and 5b show the same embodiment of a wing 5 and a hold-down arrangement 27. The only difference between FIGS. 5a and 5b is that the load-limited hold-down element 32 is shown in FIG. 5a in the first stable state and in FIG. 5b in the second state.

The buckling element 41 comprises two contact plates 43, 45 and a plurality of strip-shaped or plate-shaped connecting elements 47, for example, metal sheets, extending in parallel to one another between the contact plates 43, 45. In the first stable state shown in FIG. 5a the connecting elements 47 hold the contact plates 43, 45 spaced apart from one another at a first distance resulting in a first height 49 of the buckling element 41.

When loads transmitted through the load-limited hold-down element 32 exceed the operational thresholds, the connecting elements 47 buckle which allows the buckling element 41 to transition to the second state shown in FIG. 5b. In the second state the contact plates 43, 45 are held spaced apart from one another by the connecting elements 47 at a second distance which smaller than the first distance. Thus, a second height 51 of the buckling element 41 shown in FIG. 5b is smaller than the first height 49.

As with the previously discussed load-limited hold-down elements 32, once buckling element 41 deforms into the second state, the hold down arrangement 27 does not prevent the trailing edge 22 of the high-lift device 15 from separating from the upper surface 19 of the fixed wing 7. As the buckling element 41 is rigid in the first stable state up to the operational threshold at which it suddenly deforms into the second state, the high-lift device 15 is advantageously firmly held in place and, in particular, the trailing edge 22 in extended contact with the upper surface 19 of the fixed wing 7. Once the operational threshold is reached, the high-lift device 15 is no longer forced to deform with a downward bending fixed wing 7 and the loads acting on the high-lift device 15 are considerably reduced.

The invention claimed is:

1. A wing for an aircraft comprising:
a fixed wing with a leading edge extending along a spanwise direction of the fixed wing and an upper surface forming a suction side of the fixed wing, a lower surface forming a pressure side of the fixed wing and a leading edge of the fixed wing,
a high-lift device movable between a retracted position and a deployed position and attached to the leading edge of the fixed wing via a first support and a second support, wherein the first support is spaced apart from the second support in the spanwise direction and wherein in the retracted position a trailing edge of the high-lift device is in extended contact with the upper surface of the fixed wing, and
a hold-down arrangement arranged between the first support and the second support, wherein the hold-down arrangement includes a first hold-down element attached to the high-lift device and a second hold-down element attached to the fixed wing,
wherein the hold-down arrangement is configured such that the first hold-down element is in contact with the second hold-down element when the high-lift device is in the retracted position but is not in contact with the second hold-down element when the high-lift device is in the deployed position;
wherein while the high-lift device is in the retracted position, the hold down arrangement prevents the trailing edge of the high-lift device from separating from the upper surface of the fixed wing when the fixed wing deforms in the spanwise direction,
wherein one of the first hold-down element and the second hold-down element is a load-limited hold-down element which has at least a first stable state and a second state,
wherein the load-limited hold-down element is configured such that the hold-down arrangement prevents the trailing edge of the high-lift device from separating from the upper surface of the fixed wing when the load-limited hold-down element is in the first stable state and the high-lift device is in the retracted position,
wherein the hold-down arrangement does not prevent the trailing edge of the high-lift device from separating from the upper surface of the fixed wing when the load-limited hold-down element is in the second state and the high-lift device is in the retracted position, and that the load-limited hold-down element transitions from the first stable state to the second state when loads transmitted through the load-limited hold-down element to prevent the trailing edge of the high-lift device from separating from the upper surface of the fixed wing exceed an operational threshold, and
wherein the second hold-down element is between the upper surface and the lower surface of the fixed wing and is aft of the leading edge of the fixed wing.

2. The wing according to claim 1, wherein the second hold-down element is the load-limited hold-down element.

3. The wing according to claim 1, wherein the load-limited hold down element is a disk spring.

4. The wing according to claim 1, wherein the load-limited hold-down element is a buckling element comprising:

contact plates, and strip-shaped or plate-shaped connecting elements extending in parallel towards one another between the contact plates, wherein in the first stable state the plurality of connecting elements are configured to hold the contact plates spaced apart from one another at a first distance, and wherein the connecting elements are configured to buckle when loads transmitted through the load-limited hold-down element for preventing the trailing edge of the high-lift device from separating from the upper surface of the fixed wing exceed the operational threshold such that the buckling element transitions to the second state in which the contact plates are held spaced apart from one another by the connecting elements at a second distance, wherein the second distance is smaller than the first distance.

5. The wing according to claim 4, wherein the connecting elements are configured such that buckling of the connecting elements is an elastic deformation.

6. The wing according to claim 1, wherein the load-limited hold down element is configured such that the load-limited hold-down element transitions from the second state to the first stable state when a load acting on the load-limited hold down element exceeds a reset threshold, wherein the reset threshold is lower than the operational threshold.

7. The wing according to claim 6, wherein the hold-down arrangement comprises a bias element configured to bias the load-limited hold-down element towards the first stable position.

8. The wing according to claim 7, wherein the bias element includes a spring.

9. The wing according to claim 6, wherein the second state is a metastable state.

10. The wing according to claim 1, wherein the high-lift device is a slat.

11. A hold-down arrangement for a wing of an aircraft, the wing comprising:

a fixed wing including a leading edge extending along a spanwise direction of the fixed wing and an upper surface forming a suction side of the fixed wing, a lower surface forming a pressure side of the fixed wing and a leading edge of the fixed wing;

a high-lift device movable between a retracted position and a deployed position and attached to the leading edge of the fixed wing via a first support and a second support, wherein the first support is spaced apart from the second support in the spanwise direction; and, wherein in the retracted position a trailing edge of the high-lift device is in extended contact with the upper surface of the fixed wing;

a first hold-down element attachable to the high-lift device of the wing; and a second hold down element attachable to the fixed wing such that the first hold-down element is in contact with the second hold-down element when the high-lift device is in the retracted position but is not in contact with the second hold-down element when the high-lift device is in the deployed position, wherein the hold-down arrangement is arranged between the first support and the second support of the wing and that in the retracted position of the high-lift device, wherein the hold-down arrangement is configured to prevent the trailing edge of the high-lift device from separating from the upper surface of the fixed wing when the fixed wing deforms in the spanwise direction, wherein one of the first hold-down element and the second hold-down element is a load-limited hold-down element which has at least a first stable state and a second state, wherein the load-limited hold-down element is configured such that the hold-down arrangement prevents the trailing edge of the high-lift device from separating from the upper surface of the fixed wing when the load-limited hold-down element is in the first stable state and the high-lift device is in the retracted position, wherein the hold-down arrangement does not prevent the trailing edge of the high-lift device from separating from the upper surface of the fixed wing when the load-limited hold-down element is in the second state and the high-lift device is in the retracted position, wherein the load-limited hold-down element transitions from the first stable state to the second state when loads transmitted through the load-limited hold-down element configured to prevent the trailing edge of the high-lift device from separating from the upper surface of the fixed wing exceed an operational threshold, and wherein the second hold-down element is between the upper surface and the lower surface of the fixed wing and is aft of the leading edge of the fixed wing.

12. An aircraft comprising a fuselage and the wing according to claim 1.

* * * * *